ial No. 206,291

United States Patent Office 2,699,430
Patented Jan. 11, 1955

2,699,430

SILICA-MAGNESIA CATALYST AND ITS METHOD OF MANUFACTURE

John W. Teter, Chicago, Ill., assignor to Sinclair Refining Company, New York, N. Y., a corporation of Maine No Drawing. Application January 16, 1951,
Serial No. 206,291

4 Claims. (Cl. 252—448)

My invention relates to the manufacture of silica-magnesia gel-type catalysts having special value in the conversion of hydrocarbon oils by catalytic cracking methods. In a more particular aspect, my invention relates to the manufacture of a bead-form silica-magnesia cracking catalyst of improved physical and cracking activity properties.

Application of my invention provides a catalyst structure of relatively low density of good hardness and strength, and having good product distribution and activity in the cracking reaction. The improved catalyst comprises a washed, dried and calcined, hydrothermally treated hydrogel formed from a slurry consisting essentially of 25 to 80 per cent of preformed finely divided dry silica-magnesia catalyst based on the dry weight of the finished catalyst in aqueous sodium silicate solution with sufficient finely divided magnesia for an over-all magnesia content of about 23 to about 33 per cent based on the dry weight of the finished catalyst.

The new catalysts of this nature are produced by forming a slurry of finely divided magnesia and preformed finely divided dry silica-magnesia catalyst in a sodium silicate solution and adding an aqueous mineral acid such as aqueous sulfuric acid to the slurry to convert the silicate to the hydrosol state. The hydrosol quickly sets to the hydrogel, which is washed substantially free of sulfate and sodium ions by water-washing and digested in hot water at about 120° to 180° F. for several hours. The thus hydrothermally treated and washed hydrogel is dried conventionally to a low water content and then is calcined and ground in the usual manner. The new catalysts may be readily produced in bead form by causing droplets of the hydrosol to set to gel form in an oil bath and collecting the solidified droplets or beads after allowing gelation time in the oil medium. Similarly, the new catalysts may be produced in microspherical form by spray drying the hydrosol in the usual way before proceeding with the hydrothermal treating, washing and drying steps.

The new catalysts have special value in bead form because it has proved very difficult to obtain a commercially acceptable silica-magnesia bead catalyst. Indeed it has proved most difficult to produce macro-particle silica-magnesia catalyst of commercial acceptability in any of the forms necessary for moving bed or fixed bed catalytic cracking operations. The previously attempted catalysts have been low in activity due to low magnesia content and have been so relatively dense and fine-pored that they have accentuated the problem of regenerability. The manufacture of bead-form silica-magnesia catalyst has presented the particular problem of incorporating sufficient magnesia into the composition for acceptable activity in the cracking reaction. About 23 to about 33 weight per cent magnesia based on the dry weight of the finished catalyst is required and, at these levels, the physical structure of the catalyst has proved especially weak so that beads formed from the usual hydrogels fracture almost 100 per cent on drying. Unlike the situation presented in manufacturing silica-alumina catalysts in bead form it is difficult to have the necessary quantity of magnesium ion in solution in conventionally prepared hydrosols and still realize a sufficiently rapid gelation to allow bead form formation by the oil drop technique of commercial practice. A gelling time of less than ½ minute and not more than 3 or 4 minutes maximum is required. In the case of silica-alumina catalysts, the incorporation of the requisite quantity of aluminum ion does not result in this problem.

My invention will be further illustrated with reference to the following example of a typical preparation and its properties. The starting suspension was prepared by diluting 125 ml. of Philadelphia Quartz Company "E" brand sodium silicate, which has a gravity of 40° Baumé and an alkali to silica ratio equal to 1:3.2, with 375 ml. of water and adding, with stirring, 250 grams of a spray-dried silica-magnesia catalyst, 95 weight per cent of which would pass a 300-mesh screen. Thereafter 21.4 grams of calcined magnesite was added with stirring. The calcined magnesite had been ground so that 90 weight per cent would pass a 200-mesh screen. After thorough stirring, one molar sulfuric acid was added to the slurry to lower its pH to a value of eight. The sulfuric acid had been separately cooled to room temperature after dilution to approximately one molar strength, and the slurry was agitated during the acidification. Without additional reactants the hydrosol gelled in about 1 minute. The hydrogel was washed with demineralized water, at room temperature, until the effluent gave a negative test for sulfate ion. The wash of course removes the sodium ion as well, but it is more convenient to test for the presence of sulfate ion. The hydrogel was hydrothermally treated, i. e. digested in water for 6 hours at 160° F., in order to promote interaction of the magnesia and silica hydrogel phases so as to obtain a composition having catalytic activity. The hydrothermally treated hydrogel was filtered and oven-dried overnight at 110° C. The dried gel then was ground to pass a 200-mesh screen and was calcined for 2 hours at 1050° F.

The finished catalyst had a tapped apparent density of 0.52 grams per milliliter and had the following analysis: 29.6 weight per cent MgO, 0.18 weight per cent $Na_2O$ and 0.01 weight per cent sulfate. Upon evaluation in the usual manner by bench scale cracking tests, the catalysts had the following properties: relative activity 112, $D+L$ activity 58.5, gas factor 0.68 and coke factor 0.60.

By contrast, a similar silica-magnesia catalyst, prepared in the same manner except that calcined magnesia was not incorporated into the starting slurry and the hydrothermal treatment was omitted, analyzed 23 per cent MgO and had a $D+L$ activity of only 39. The lower activity is not an indication of the magnesia content because there is little change in activity over the 23 to 33 weight per cent magnesia range. For example, another silica-magnesia cracking catalyst of 22.3 weight per cent MgO was characterized by a 56 $D+L$ activity level. Also by contrast, another silica-magnesia cracking catalyst was prepared in a manner exactly analogous to that producing the catalyst of my invention except that the preformed silica-magnesia added to the starting slurry was in the hydrogel state. The magnesia content was 31 per cent and the catalyst had a good $D+L$ activity of 58. However, the tapped apparent density was 0.96 grams per milliliter which directly reflects undesirable physical structure and porosity for regenerability.

In the practice of my invention the preformed silica-magnesia catalyst added to the starting slurry should contain less than 35 per cent water and should be of less than 200-mesh particle size. It should be added in an amount approximating 25 to 80 per cent based on the dry weight of the finished catalyst. Sufficient magnesia in finely divided form must be added to maintain the silica-magnesia ratio in the 23 to 33 per cent range. The sodium silicate solution should be dilute enough to provide fluidity for the suspension.

The slurry should be acidified to a pH value providing rapid gelling time, yet avoiding solution of the magnesia particles. A pH of about 7 to 9 is satisfactory and provides a gelling time of about ½ to 3 or 4 minutes which is suitable for bead forming by the oil drop method. Aqueous sulfuric acid is the best agent. The hydrothermal treatment as indicated above is essential and requires several hours treatment dependent upon the temperature which may be 120° to 180° F. The higher the temperature, the shorter may be the period of treatment. The hydrogel should be washed substantially free of the undesired sodium and sulfate ions by water washing or by ion exchange solutions. The washed hydrogel is dried in the usual manner slowly at about 110° C. to reduce the water content to about 20 per cent or less.

The beads are formed directly from the hydrosol in known manner by dropping the sol in particle form through an oil bath which provides a gelling medium. A mixing nozzle to which the slurry and acid are separately fed is conveniently employed with a grooved distributing cone which distributes droplets of the hydrosol over the surface of the oil bath. The oil bath is of sufficient depth to provide gelling time and the solidified particles are conveniently collected in a lower aqueous layer from which they may be continuously sluiced out for the washing, hydrothermal treating and drying steps. In the drying operation, a tunnel type or kiln drier may be employed, advantageously equipped for steam humidification in the case of the bead form material to avoid fracturing by too rapid drying. The dried catalyst is finished in the usual manner by calcining at about 1000° to 1350° F.

Hence my invention provides a silica-magnesia catalyst essentially characterized by the particular particle form and physical state of the essential components of the finished gel structure comprising the ultimate catalyst particles. My invention includes the method of combining the components, forming the hydrogel and hydrothermally treating it before finishing with the usual particle forming, washing, drying and calcining operations. The new catalysts may be used advantageously in bead form in fixed bed or moving bed type catalytic cracking processes. The finely divided or ground catalysts, or micro-spherical catalysts formed by spraying-drying advantageously are employed in the fluid catalyst type cracking operations. Conditions of use of course are well known, but involve catalyst and oil contacting at ratios of about 3/1 to 15/1 under temperature conditions of about 800° to 1100° F. Carbonaceous matter or coke deposited in the cracking reaction is cyclically removed by a separate regeneration operation by contacting the spent catalyst with air or an oxygen-containing gas. The new catalysts show excellent product distribution and regenerability resulting in advantages in the conversion processes and, unlike previously attempted silica-magnesia beads, have the rigidity and strength necessary for handling in the catalyst handling systems.

I claim:

1. In the manufacture of silica-magnesia cracking catalysts containing about 23 to 33 weight per cent magnesia, the method which comprises forming a slurry of finely divided magnesia and about 25 to 80 per cent of preformed finely divided dry silica-magnesia cracking catalyst based on the dry weight of the finished catalyst, in aqueous sodium silicate solution, gelling the mixture by the addition of aqueous sulfuric acid, washing the resulting hydrogel until substantially free of sodium and sulfate ions, digesting the hydrogel in water at about 120° to 180° F. for several hours, drying and calcining the resulting hydrothermally treated hydrogel.

2. In the manufacture of silica-magnesia cracking catalysts containing about 23 to 33 weight per cent magnesia, the method which comprises forming a slurry of finely divided magnesia and about 25 to 80 per cent of preformed finely divided dry silica-magnesia cracking catalyst based on the dry weight of the finished catalyst, in aqueous sodium silicate solution, adding aqueous sulfuric acid to the mixture to form a hydrosol, gelling the resulting hydrosol into bead-like or spherical particles, washing the resulting hydrogel until substantially free of sodium and sulfate ions, digesting the hydrogel in water at about 120° to 180° F. for several hours, drying and calcining the resulting hydrothermally treated hydrogel.

3. A silica-magnesia cracking catalyst produced by the method which comprises forming a slurry of finely divided magnesia in an amount sufficient for an overall magnesia content of about 23 to 33 per cent, based on the dry weight of the finished catalyst, and about 25 to 80 per cent of a preformed finely divided dry silica-magnesia cracking catalyst, based on the dry weight of the finished catalyst, in an aqueous sodium silicate solution, gelling the mixture by the addition of aqueous sulfuric acid, washing the resulting hydrogel until substantially free of sodium and sulfate ions, digesting the hydrogel in water at about 120° to 180° F. for several hours, drying and calcining the resulting hydrothermally treated hydrogel.

4. The catalyst of claim 3 in bead form.

References Cited in the file of this patent

UNITED STATES PATENTS

| Number | Name | Date |
|---|---|---|
| 2,487,065 | Milliken | Nov. 3, 1949 |
| 2,551,014 | Kimberlin | May 1, 1951 |